United States Patent
Ohlsson et al.

(10) Patent No.: US 10,900,705 B2
(45) Date of Patent: Jan. 26, 2021

(54) METHOD AND SYSTEM FOR REDUCING MOISTURE CONTENT OF A COOLING COMPARTMENT

(71) Applicant: JOHN BEAN TECHNOLOGIES AB, Helsingborg (SE)

(72) Inventors: Håkan Per Ohlsson, Furulund (SE); Rip Martin Ek, Rydebäck (SE)

(73) Assignee: JOHN BEAN TECHNOLOGIES AB, Helsingborg (SE)

( * ) Notice: Subject to any disclaimer, the term of this patent is extended or adjusted under 35 U.S.C. 154(b) by 88 days.

(21) Appl. No.: 15/923,924

(22) Filed: Mar. 16, 2018

(65) Prior Publication Data

US 2019/0285330 A1   Sep. 19, 2019

(51) Int. Cl.
| | |
|---|---|
| F25D 25/04 | (2006.01) |
| F25D 21/14 | (2006.01) |
| F25D 21/04 | (2006.01) |
| F25D 21/08 | (2006.01) |
| F24F 3/14 | (2006.01) |

(Continued)

(52) U.S. Cl.
CPC ............ *F25D 21/14* (2013.01); *F25D 21/04* (2013.01); *F25D 21/08* (2013.01); *F25D 25/04* (2013.01); *B01D 53/265* (2013.01); *F24F 3/1405* (2013.01); *F24F 2003/1452* (2013.01); *F25D 21/002* (2013.01); *F25D 21/004* (2013.01); *F25D 21/006* (2013.01)

(58) Field of Classification Search
CPC ...... F25D 25/04; F25D 21/002; F25D 21/004; F25D 21/006; F25D 21/14; F25D 21/08; F24F 3/1405; F24F 2003/1452; B01D 53/265

See application file for complete search history.

(56) References Cited

U.S. PATENT DOCUMENTS

| 2,257,487 A | 9/1941 | Tenney |
| 3,938,651 A | 2/1976 | Alfred et al. |

(Continued)

FOREIGN PATENT DOCUMENTS

| EP | 2 453 190 A1 | 5/2012 |
| JP | 2004-4360979 A | 12/2004 |

OTHER PUBLICATIONS

International Search Report dated May 28, 2019, issued in corresponding Application No. PCT/EP2019/056495, 15 pages.

(Continued)

*Primary Examiner* — David J Teitelbaum
(74) *Attorney, Agent, or Firm* — Christensen O'Connor Johnson Kindness PLLC (57) ABSTRACT

A method of reducing moisture content of a cooling compartment includes increasing a temperature of the cooling compartment to a minimum temperature level, decreasing the temperature of the cooling compartment to a maximum temperature level, and draining any condensed moisture from the cooling compartment. A system for reducing moisture content of a cooling compartment includes a coil assembly configured to increase a temperature of the cooling compartment to a minimum temperature level and decrease the temperature of the cooling compartment to a maximum temperature level, and a drain for draining any condensed moisture from the cooling compartment.

19 Claims, 7 Drawing Sheets

(51) Int. Cl.
*B01D 53/26* (2006.01)
*F25D 21/00* (2006.01)

(56) References Cited

U.S. PATENT DOCUMENTS

| | | | | |
|---|---|---|---|---|
| 4,173,127 A | * | 11/1979 | Sandberg | A23L 3/361 |
| | | | | 62/374 |
| 4,409,794 A | * | 10/1983 | Kitani | F25B 29/003 |
| | | | | 426/444 |
| 4,584,849 A | * | 4/1986 | Cloudy | F25D 13/067 |
| | | | | 62/303 |
| 5,222,375 A | * | 6/1993 | Conrad | B60H 1/3202 |
| | | | | 62/241 |
| 5,345,775 A | * | 9/1994 | Ridenour | F25D 21/006 |
| | | | | 62/140 |
| 5,493,870 A | * | 2/1996 | Kodama | B60H 1/00907 |
| | | | | 62/155 |
| 5,803,232 A | | 9/1998 | Fröderberg | |
| 6,059,027 A | * | 5/2000 | Lake | B60H 1/00907 |
| | | | | 165/204 |
| 2009/0223240 A1 | | 9/2009 | Bean, Jr. | |
| 2014/0013794 A1 | * | 1/2014 | Junge | F25D 17/065 |
| | | | | 62/426 |
| 2014/0250930 A1 | * | 9/2014 | Unezaki | B01D 53/261 |
| | | | | 62/151 |

OTHER PUBLICATIONS

Written Opinion of the International Preliminary Examining Authority, dated Feb. 12, 2020, 6 pages.
International Preliminary Report on Patentability for related International Application No. PCT/EP2019/056495, dated Jul. 1, 2020, 13 pages.

* cited by examiner

METHOD AND SYSTEM FOR REDUCING MOISTURE CONTENT OF A COOLING COMPARTMENT

BACKGROUND

A freezer or chiller typically includes moisture within the interior of the freezer/chiller compartment after defrosting the compartment, after cleaning the compartment, etc. Drying or otherwise removing moisture from the freezer (or chiller) after defrost, cleaning, etc., and before bringing the compartment back down to the freezing or cooling temperature, is important especially for mechanical reasons. For example, if there is significant water left on the belt of a spiral freezer after defrost or cleaning, it can cause issues when the compartment is lowered in temperature and the water freezes. The frozen water on the belt can prevent belt movement, obstruct airflow, or cause other issues. Certain freezing or cooling applications may also require a substantially dry compartment in order not to adversely affect product hygiene or product quality.

A typical prior art method for drying a spiral freezer may involve the following steps: (1) using a fan arrangement to blow water off of the belt; (2) running the main freezer fans to add heat and thereby increase the temperature in the freezer compartment for evaporating residual water; and (3) optionally opening the compartment doors to move evaporated water out of the freezer. The steps are repeated until the necessary amount of moisture is removed from the spiral freezer. This prior art method is very time consuming, leading to a significant loss of valuable production time. Moreover, the lengthy drying procedure consumes significant power, wears out the drive system, and affects the processing plant atmosphere.

Accordingly, it can be appreciated that an improved method and system for reducing the moisture content of a spiral freezer or another suitable cooling compartment is desired.

SUMMARY

A method of reducing moisture content of a cooling compartment includes increasing a temperature of the cooling compartment to a minimum temperature level, decreasing the temperature of the cooling compartment to a maximum temperature level, and draining any condensed moisture from the cooling compartment.

A system for reducing moisture content of a cooling compartment includes a coil assembly configured to increase a temperature of the cooling compartment to a minimum temperature level and decrease the temperature of the cooling compartment to a maximum temperature level, and a drain for draining any condensed water from the cooling compartment.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known structures or process steps have not been described in detail in order not to unnecessarily obscure various aspects of the present disclosure. Further, it will be appreciated that embodiments of the present disclosure may employ any combination of features described herein.

Embodiments of the present disclosure are directed to systems and methods for reducing the moisture content of a cooling compartment in a self-stacking spiral conveyor system, such as a spiral freezer system. It should be appreciated, however, that a freezer system in accordance with embodiments of the present disclosure need not include a spiral stack, as described herein. In that regard, the method and systems described herein may be used with other respective belt assemblies, such as a linear belt conveyor system.

In addition, the systems and methods described herein can be used with other suitable cooling compartments, such as a cooling compartment of a refrigerator, a chiller, etc. Accordingly, the term "cooling compartment" shall be broadly interpreted to mean any compartment of a system that is cooled (for instance, to treat a food product) and that may accumulate moisture inside the chamber over time, such as with a freezer compartment, a refrigeration compartment, a chiller compartment, or any other suitable compartment. In that regard, specific configurations and process steps may be suitable for different cooling chambers and configurations.

Figure 1:
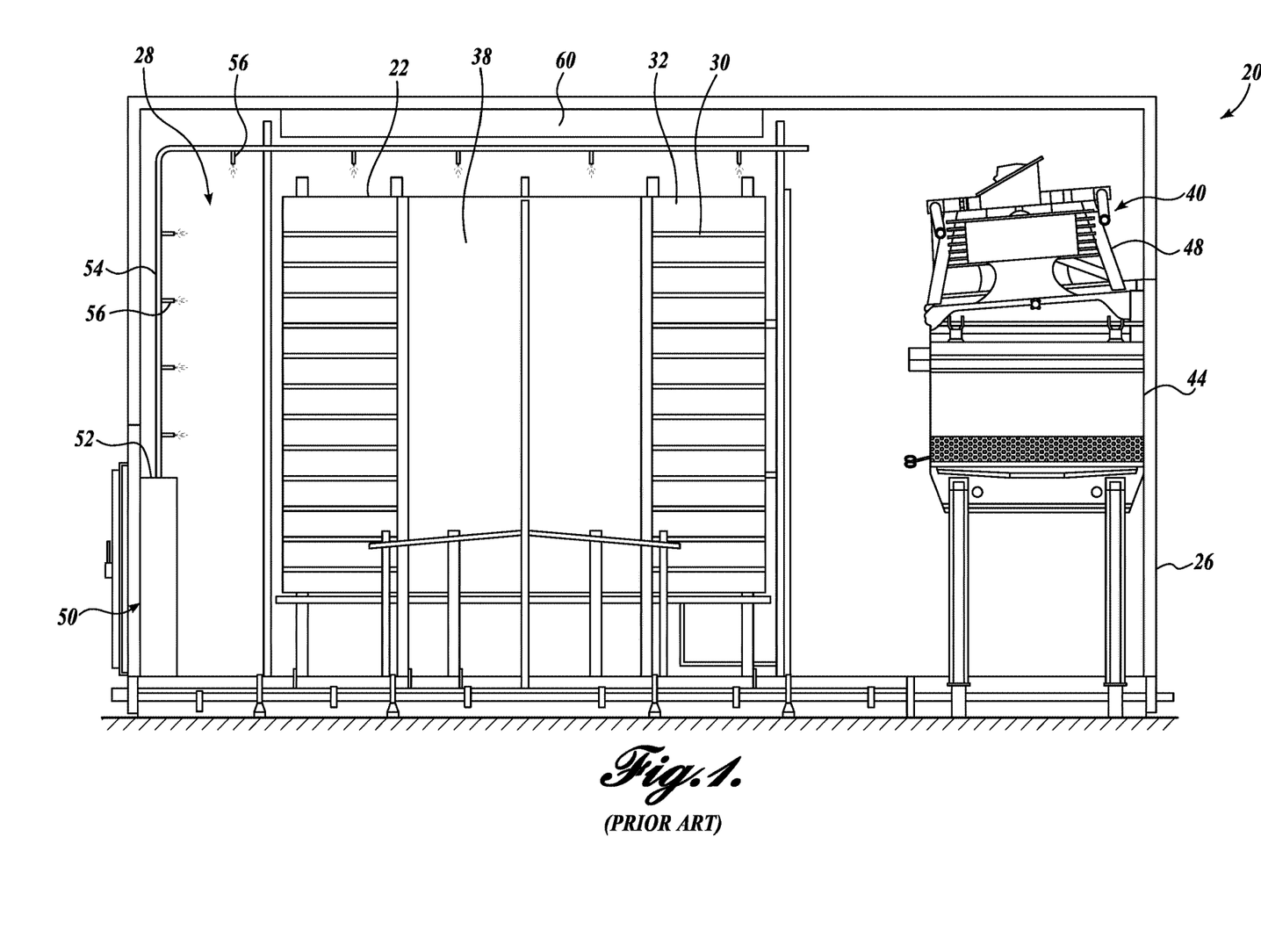
FIG. 1 is a cross-sectional view of an exemplary prior art freezer system including a spiral stack in a freezer chamber.

Referring to FIG. 1, an exemplary spiral freezer system 20 is depicted. The spiral freezer system 20 includes a spiral stack 22 contained within an insulated housing 26 defining a cooling compartment 28. The spiral stack 22 is formed from a pervious conveyor belt 30 that supports and transports products within the freezer chamber 26. The conveyor belt 30 moves in both linear and spiral patterns within the spiral freezer system 20. More specifically, the conveyor belt 30 moves in a linear pattern at the entry and exit portals (not shown) of the spiral stack 22, and the conveyor belt 30 moves in a spiral or helical path within the spiral stack 22. The conveyor belt 30 moves products within the spiral stack 22 in an ascending or descending spiral or helical path as is well known in the art.

The conveyor belt 30, when formed as a spiral stack 22, is configured into a plurality of tiers 32 that are stacked on top of one another (i.e., known in the art as a "self-stacking" conveyor belt). Each tier 32 of the stack 22 forms a pervious annulus through which air or treatment gas may flow. When formed in a spiral stack 22, the plurality of tiers 32 creates an inner cylindrical channel 38, through which air or treatment gas may also travel. Products (not shown) travel on the conveyor belt 30 are frozen by a suitable refrigerated treatment gas. Exemplary spiral stacks 22 may have any number of tiers 32, typically in the range of about 10 to about 40 tiers.

Suitable embodiments of spiral stacking belts are shown and described in U.S. Pat. No. 3,938,651, issued to Alfred et al., and U.S. Pat. No. 5,803,232, issued to Frodeberg, the disclosures of which are hereby expressly incorporated by reference. However, it should be appreciated that other suitable spiral belt assemblies are also within the scope of the present disclosure.

The spiral freezer system 20 includes an air cooler unit 40 for supplying refrigerated treatment gas to food products within the spiral stack 22. In that regard, the air cooler unit 40 includes a coil assembly, an evaporator 44, at least one fan 48, and other necessary components, such as a compressor, condenser, etc. (not shown in FIG. 1), for supplying suitable treatment gas for heat exchange with the products, as is well known in the art.

The spiral freezer system 20 may further include an integrated cleaning system 50 configured to wash, rinse, defrost, or sanitize the interior of the freezer. Any suitable integrated or separate cleaning system may be used to clean the interior of the freezer. In the depicted embodiment, the cleaning system 50 includes a cleaning agent supply source 52 that supplies a cleaning agent (such as pressurized water, water +cleaning chemicals, steam, etc.) to one or more outlets 56 (such as sprinkler heads, nozzles, etc.) through a cleaning agent supply line 54. A belt blower 60 may be used to blow excess cleaning agent off the stack 22 at the end of the cleaning process. However, it can be appreciated that after cleaning the interior of the freezer, or after other similar processes, residual moisture will remain inside the freezer compartment 28.

Figure 2:
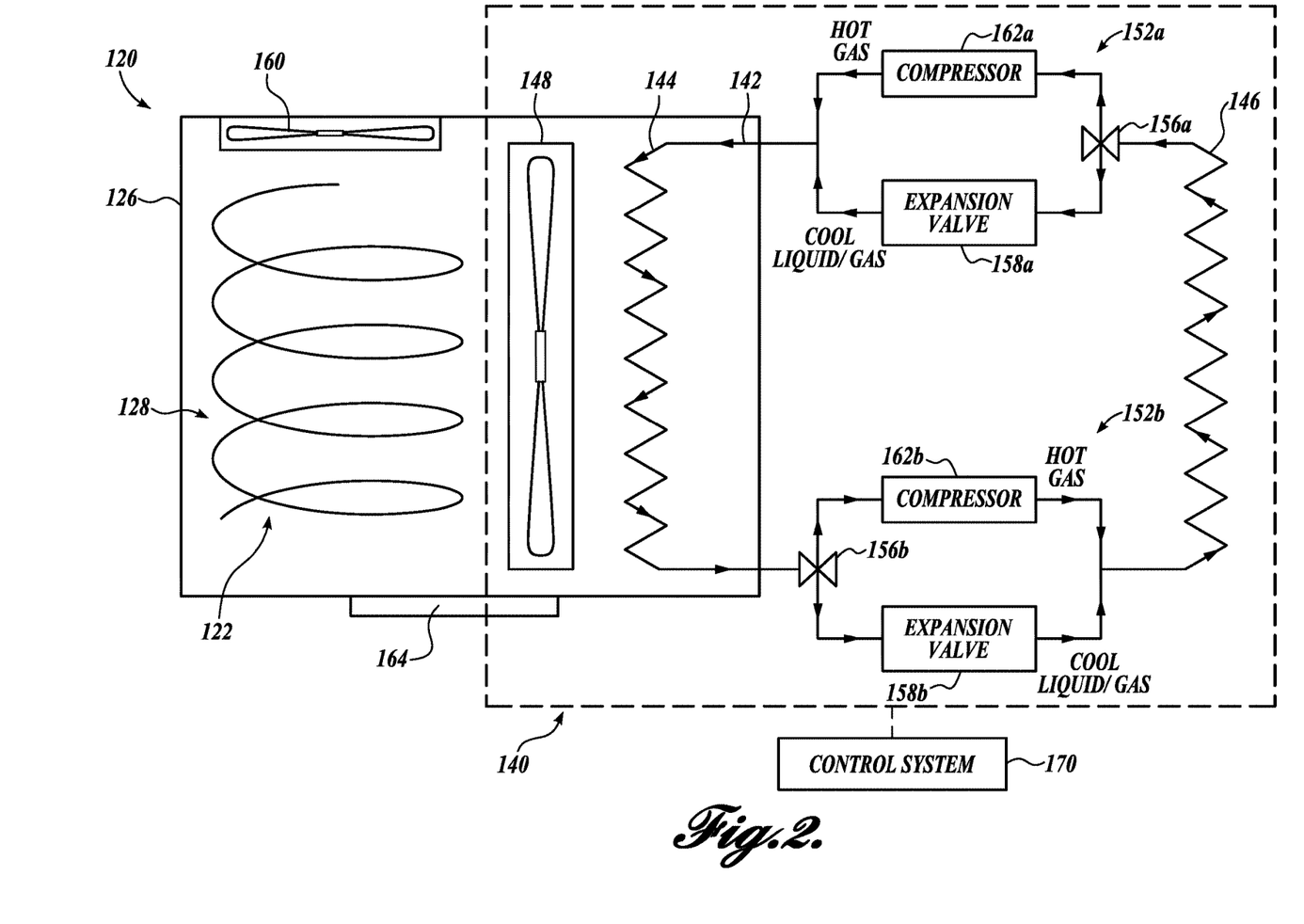
FIG. 2 is a schematic view of a system for reducing the moisture content of a cooling compartment formed in accordance with a first exemplary embodiment of the present disclosure.

FIG. 2 depicts a schematic view of a system 140 configured for reducing moisture content of a cooling compartment (hereinafter "moisture reduction system 140"), such as after the cleaning process or whenever significant moisture has accumulated (as determined by the user or from predetermined criteria). In general, the system includes a coil assembly configured to increase a temperature of the cooling compartment to a minimum temperature level and decrease the temperature of the cooling compartment to a maximum temperature level, and a drain for draining any condensed water from the cooling compartment.

The moisture reduction system 140 is shown schematically in use with a spiral freezer system 120 having certain similar or identical components to the spiral freezer system 20 described above with reference to FIG. 1. Accordingly, certain like parts are labeled with similar reference numerals except in the '100 series. In that regard, the spiral freezer system 120 includes a spiral stack 122 located within an insulated housing 126 that defines an interior cooling compartment 128. A belt blower 160 or other suitable air circulation device may be positioned laterally to the stack 122 or at the top interior portion of the compartment 128, such as over the stack 122, for blowing excess moisture off the surfaces of the stack (or other components) after, for instance, a cleaning cycle. A drain 164 may be located near the bottom of the housing 126 for allowing any excess or condensed moisture to drain out of the compartment 128. In that regard, the blower 160 and drain 164 may be considered as components of the moisture reduction system 140 configured for reducing moisture content of a cooling compartment.

The moisture reduction system 140 further includes a heating/cooling assembly having a coil assembly 142 configured to transport refrigerant, coolant or another suitable fluid (hereinafter collectively referred to as "refrigerant"), either in a liquid or gas state, within the interior and/or exterior of the cooling compartment 128 for heating or cooling the compartment. The heating/cooling assembly may be part of the freezer unit of the spiral freezer system 120 (such as part of air cooler unit 40 described with respect to FIG. 1) and configured to cool the cooling compartment 128 during normal operation (i.e., to freeze products), or the heating/cooling assembly may instead be separate from the freezer unit of the spiral freezer system 120. If the heating/cooling assembly is part of the freezer unit, it may be adapted with special valve assemblies and other mechanical and electrical components that allow the coil assembly 142 to both heat and cool the cooling compartment 128.

In the embodiment depicted in FIG. 2, the coil assembly 142 includes an interior coil section 144 is located inside the spiral freezer system 120 and an exterior coil section 146 located outside the spiral freezer system 120. The exterior coil section 146 may be simply located outside the insulated housing 126 (an in communication with the facility atmosphere), within a coldstore, within a cooling compartment of another freezer, refrigeration, or chiller unit, etc. In one instance, the interior coil section 144 is configured to cool the air in the cooling compartment 128 when an appropriate refrigerant is passed therethrough, and the exterior coil section 146 is configured to remove heat from the refrigerant accordingly. In another instance, the interior coil section 144 is configured to heat the air in the cooling compartment 128 when an appropriate refrigerant is passed therethrough, and the exterior coil section 146 is also configured to cool the ambient air (exterior of the freezer 120) to complete the refrigeration/freezer cycle. In other words, the coil assembly 142 can be used to heat or cool the cooling compartment 128 based upon predetermined operational parameters. By heating and cooling the cooling compartment 128 in series in a controlled manner, as will be described below, the moisture content of the compartment can be reduced. The coil assembly 142 may be used to heat or cool the compartment in any suitable manner.

For instance, in one embodiment, the interior coil section 144 may function as an evaporator to lower the temperature of the cooling compartment 128 when a cooled gas flows through the interior coil section 144 in a manner well known in the art. In that regard, one or more fans 148 or other air circulation devices are located inside the cooling compartment 128 near the interior coil section 144 to help push cooled air into the cooling compartment 128. The fan 148 may be part of the belt blower 160 (or vice versa) or a separate component thereof. With the interior coil section 144 functioning as an evaporator, the exterior coil section 146 functions as a condenser to remove heat from the refrigerant in a manner well known in the art. In other instances, the interior coil section 144 can function as a condenser to raise the temperature of the cooling compartment 128 when a hot gas flows through the interior coil section 144 in a manner well known in the art, while at the same time, the exterior coil section 146 functions as an evaporator.

The moisture reduction system 140 includes suitable mechanical and/or electrical components for manually or automatically switching the interior and exterior coil sections 144 and 146 of the coil assembly 142 between a condenser and an evaporator in the above-described manner. For instance, the moisture reduction system 140 may include suitable valve assemblies (modulating valves for controlling the flow of refrigerant, check valves, solenoid valves, stop valves, feed valves, safety valves, drain valves, suction valves, etc.) pumps, connection lines, gauges, controllers, switches, sensors, etc., as is well known in the art, for operating the interior and exterior coil sections 144 and 146 of the coil assembly 142 as a condenser and an evaporator. Detailed aspects of certain known components of the cooling system will therefore not be described for the sake of brevity. A high-level exemplary embodiment of the moisture reduction system 140 configured for reducing moisture content of a cooling compartment moisture reduction system 140 is depicted in FIG. 2. The moisture reduction system 140 includes first and second refrigerant regulator assemblies 152a and 152b in refrigerant communication with the interior and exterior coil sections 144 and 146 and configured to switch each of the coil sections between a condenser and an evaporator.

The first refrigerant regulator assembly 152a includes a first expansion valve 158a and a first compressor 162a that are each selectively placed into refrigerant communication with the exterior coil section 146 through a first valve assembly 156a. In the depicted embodiment, the refrigerant flows counterclockwise from the exterior coil section 146, to the first valve assembly 156a, to either the first expansion valve 158a (for cooling the compartment 128) or to the first compressor 162a (for heating the compartment 128), and then to the interior coil section 144. Any suitable valve assembly may be used.

After heating or cooling the compartment 128, the hot or cold refrigerant continues to flow counterclockwise from the interior coil section 144 to the second refrigerant regulator assembly 152b. In that regard, the second refrigerant regulator assembly 152b includes a second expansion valve 158b and a second compressor 162b that are each selectively placed into refrigerant communication with the interior coil section 144 through a second valve assembly 156b. In that regard, the refrigerant flows counterclockwise from the interior coil section 144, to the second valve assembly 156b, to either the second expansion valve 158b (if the compartment 128 was heated) or to the second compressor 162b (if the compartment 128 was cooled), and then to the exterior coil section 146.

Figure 3:
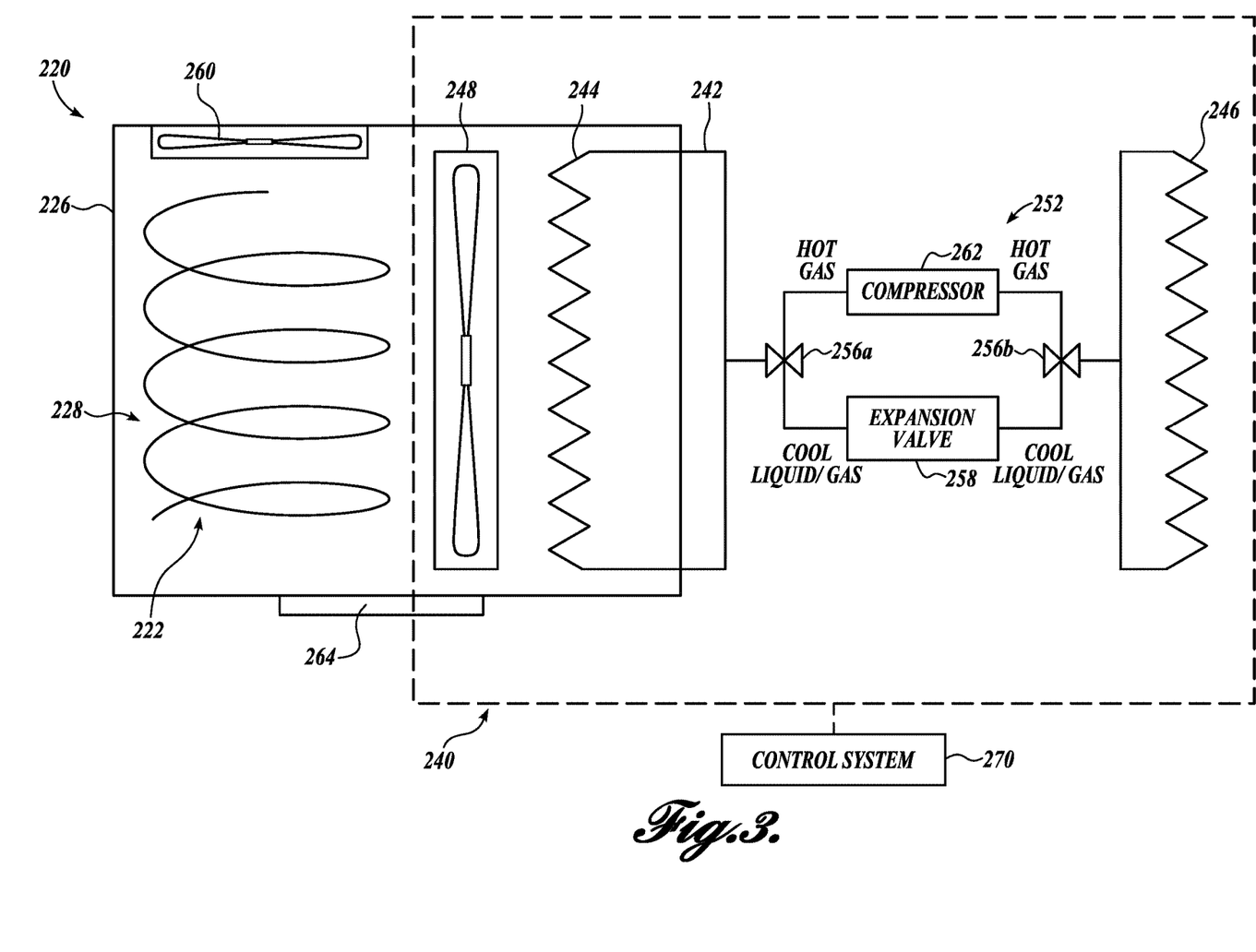
FIG. 3 is a schematic view of a system for reducing the moisture content of a cooling compartment formed in accordance with a second exemplary embodiment of the present disclosure.

In another high-level exemplary embodiment shown in FIG. 3, where certain like parts are labeled with similar reference numerals except in the '200 series, a moisture reduction system 240 includes only one refrigerant regulator assembly 252 in refrigerant communication with the interior and exterior coil sections 244 and 246 and configured to switch the coil sections between a condenser and an evaporator. In that regard, the refrigerant regulator assembly 252 includes an expansion valve 258 and a compressor 262 that are selectively placed into refrigerant communication with the interior and exterior coil sections 244 and 246 through first and second valve assemblies 256a and 256b.

Refrigerant may flow from the interior coil section 244 to the first valve 256a, to the expansion valve 258 if the compartment 228 was heated or to the compressor 262 if the compartment 228 was cooled, and thereafter through the second valve assembly 256B to the exterior coil section 246. To complete the cycle, the refrigerant flows from the exterior coil section 246 to the second valve 256b, to either the expansion valve 258 to cool the compartment 228 or to the compressor 262 to heat the compartment 228, and thereafter through the first valve assembly 256A to the interior coil section 244.

Referring to the embodiment shown in FIG. 2, a suitable control system 170 may be used to control any components of the moisture reduction system 140. For instance, the control system 170 may be used to automatically switch the interior and exterior coil sections 144 and 146 of the coil assembly 142 between a condenser and an evaporator based upon pre-programmed instructions. In one embodiment, the control system 170 is a programmable logic controller (PLC). However, it is understood and appreciated that other types of microprocessors and systems that are capable of automatically switching the coil assembly can be used instead of a PLC.

The control system 170 is coupled to the controllable components of the moisture reduction system 140 (i.e., the valve assemblies of the first and second refrigerant regulator assemblies 152a and 152b, the fan 148, the belt blower 160, etc.) through suitable wired or wireless means. As such, the control system 170 receives and processes signals from the controllable components and uses the information to control the components according to one or more operational parameters programmed into the control system 170. The operational parameters and any other data, instructions, etc., may be downloaded or uploaded to the control system 170 in any manner now known or later developed. A similar or identical control system 270 may be used for the moisture reduction system 240 of FIG. 3.

Figure 4:
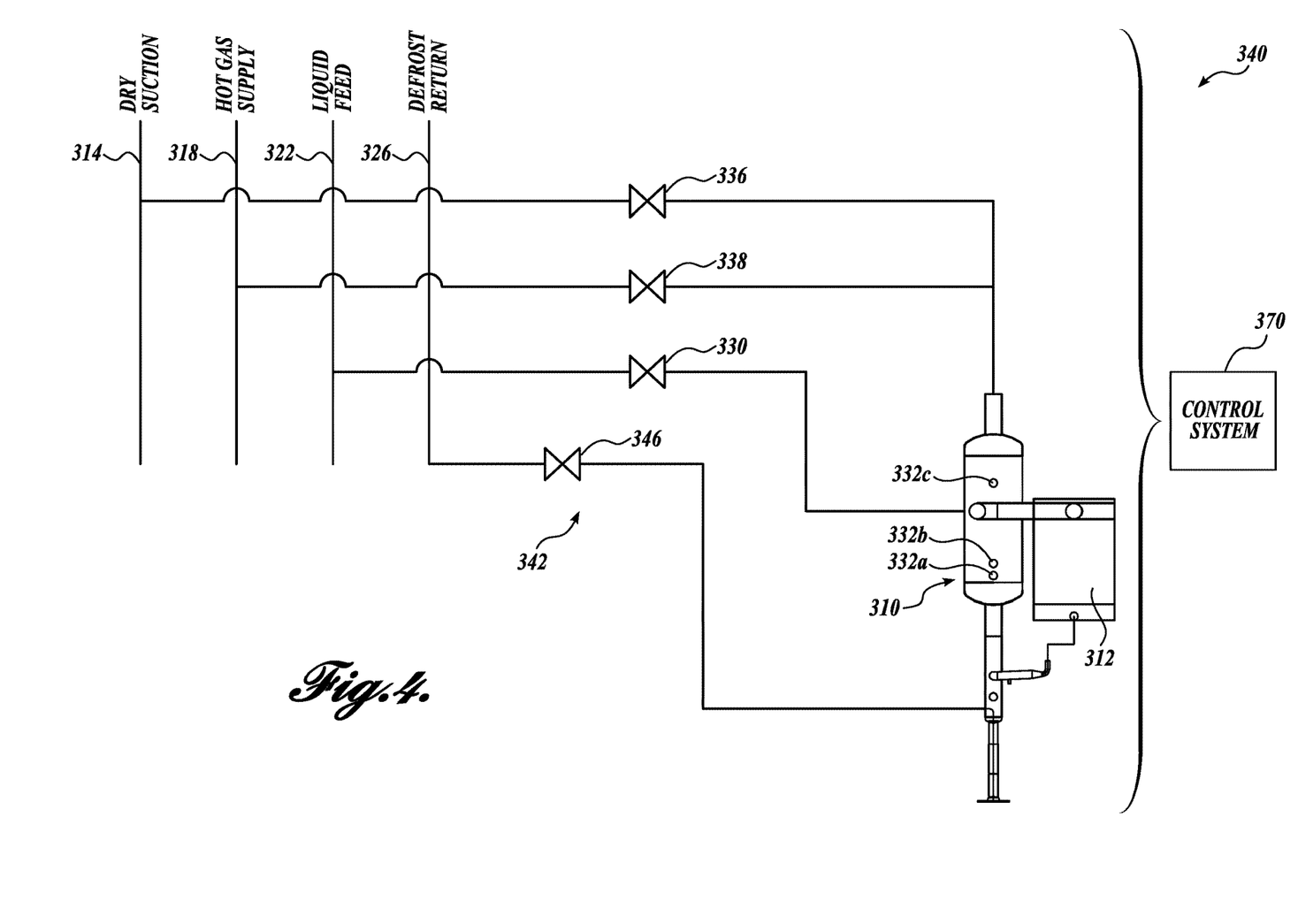
FIG. 4 is a schematic view of a system for reducing the moisture content of a cooling compartment formed in accordance with a third exemplary embodiment of the present disclosure.

In another high-level exemplary embodiment shown in FIG. 4, a moisture reduction system 340 is configured as an LVS refrigeration unit 342, similar to the Frigoscandia LVS Refrigeration units available from JBT Corporation of Chicago, IL. In the high-level exemplary embodiment shown in FIG. 4, the LVS refrigeration unit 342 generally includes an LVS vessel 310 that is in communication with a dry suction line 314, a hot gas supply line 318, a liquid feed line 322, a defrost return line 326 ("the LVS lines"), and a coil assembly 312. It should be appreciated that with the moisture reduction system 340 configured as an LVS refrigeration unit 342, the coil assembly 312 may be configured as simply an interior coil section that is in selective refrigerant communication with the LVS lines.

Suitable valves and other components are located on the LVS lines such that the LVS vessel 310 may control the state of the coil assembly (i.e., evaporator v. condenser) in accordance with known LVS refrigeration principles. For instance, a first modulating valve 330 is located on the liquid feed line 322, which modulates the refrigerant liquid flow for cooling into the LVS vessel 310 and the coil assembly (when operating as an evaporator) based on the state of level switches 332a, 332b, and 332c in the LVS vessel 310. A second modulating valve 336 located on the dry suction line 314 controls the refrigerant vapour flow out of the LVS vessel 310. The second modulating valve 336 is open during any cool-down step of the cooling chamber (i.e., when the coil assembly is operating as an evaporator). During an equalizing phase, the second modulating valve 336 slowly relieves any high pressure vapour build-up in the coil assembly and/or the LVS vessel 310. During any warm-up (hot gas condenser phase) step, the second modulating valve 336 remains closed.

A third modulating hot gas valve 338 located on the hot gas supply line 318 will open slowly during an initial phase of a cooling compartment warm-up or defrost step (i.e., when the coil assembly is operating as a condenser or when the coil assembly is being defrosted, respectively) and thereafter be fully open for as long as hot gas is required. During a warm-up or defrost step, the second modulating valve 336 remains closed to maintain the hot gas in the LVS vessel 310 and the coil assembly, and a check valve (not separately shown) together with the first modulating valve 330 ensures hot gas is not feed upstream into the liquid feed line 322.

A defrost drain valve 346 located on the defrost return line 326 along with other suitable solenoid valves (not shown) control an initial defrost drain of cold refrigerant liquid, maintain a desired hot gas pressure, and ensure that hot gas does not unnecessarily escape.

The LVS refrigeration unit 342 includes suitable check valves, solenoid valves, stop valves, feed valves, safety valves, drain valves, suction valves, gauges, switches, sensors, etc., on the LVS lines 314, 318, 322, and 326 or otherwise in communication with the other valves for operating a coil assembly as both an evaporator and a condenser to cool or heat a cooling compartment as described herein. These additional well known components are not shown or described for the sake of brevity.

Level switches within the LVS vessel 310, also not shown, are used to determine whether certain predetermined criteria are met and to control the valves and other components of the LVS refrigeration unit 342 for carrying out the method of reducing moisture within a cooling compartment. In that regard, the LVS vessel 310 may include an integrated controller for controlling the operations of the LVS refrigeration unit 342, or the LVS refrigeration unit 342 may instead be in communication with a separate controller 370.

It should be appreciated that any other suitable valve assemblies, mechanical/electrical components, etc., may be used to switch at least the interior coil section of the coil assembly between a condenser and an evaporator. Accordingly, the exemplary embodiments shown in FIGS. 2-5 should not be seen as limiting the scope of the claimed subject matter.

The systems, 140, 240, and 340 include components that can be appropriately activated and controlled to reduce the moisture content of a cooling compartment of a freezer, refrigerator, chiller, etc. In that regard, the method of reducing the moisture content of a cooling compartment will now be described.

Figure 5:
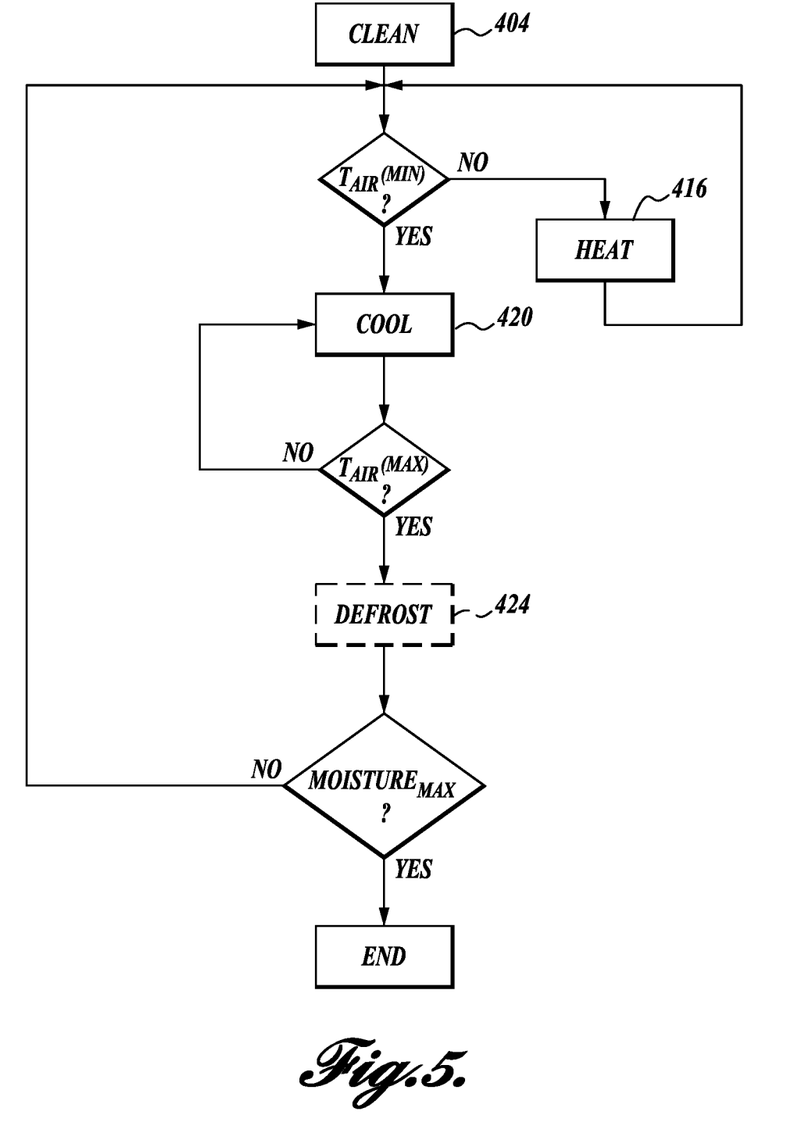
FIG. 5 is flow chart depicting a method of reducing the moisture content of a cooling compartment formed in accordance with an exemplary embodiment of the present disclosure.

FIG. 5 depicts an exemplary flow chart of a method of reducing the moisture content of a cooling compartment using the moisture reduction system 140, 240, or 340, or any other suitable system. For ease of description, the method (sometimes called the "enhanced drying process") will be described with reference to the moisture reduction system 140 depicted in FIG. 2; however, it should be appreciated that the method may instead be carried out with any suitable system or components. Moreover, the method includes steps that may be automatically carried out in response to one or more instructions sent from the control system 170. However, the steps may instead use manually operation and monitoring.

The method may begin at step 404, where an optional cleaning cycle (or similar process) is performed, after which the surfaces in the cooling compartment are wet. A belt blower 160 and/or the fan 148 may optionally be activated by the control system 170 to blow excess moisture off the belt or any other interior surfaces after the cleaning cycle. After the cleaning (and optionally blowing) cycle, the moisture level in the compartment air may be at substantially saturated conditions. Moreover, the temperature distribution in the cooling compartment, such as for the air, moisture (e.g., the remaining cleaning agent), and internal structure, may be substantially even. In other words, the temperature of the air, moisture, and structure may be substantially the same.

The compartment may be somewhat cool, for instance, 10 to 20° C., or somewhat warmer, such as between about 20 to 40° C. or even higher after cleaning, depending on the cleaning process used or other factors. It should be appreciated that after a cleaning cycle, the initial starting temperature Tstart (i.e., $Tstart_0$) may be higher than the starting temperature for subsequent cycles of the enhanced drying process.

The first cycle of the drying process may begin with a warm-up step 416 to load energy (in the form of heat) into the air, moisture, and structure to be dried. During the warm-up step 416, the air temperature of the cooling compartment is increased to a minimum temperature level or range ($T_{air}$(min)), as defined by predetermined parameters programmed into the control system 170, such as, for instance, 10-30° C. The minimum temperature level $T_{air}$(min) is the required temperature needed to load the appropriate amount of energy (i.e., heat) into the structure and moisture such that at least some evaporation of moisture occurs during a subsequent cool down step, as will be described. If the warm-up step 416 is following a cleaning cycle, the warm-up step 416 may essentially take little to no time since the starting temperature Tstart may be somewhat close to the minimum temperature level $T_{air}$(min). To increase the air temperature in the cooling compartment 128, the control system 170 may operate the interior coil section 144 as a condenser to circulate warm air into the cooling compartment 128. At the same time, the fan 148 (belt blower, and/or other fans) are activated to move the heated air within the compartment 128. The cooling compartment air temperature is gradually raised until the minimum temperature level $T_{air}$(min) is reached. The warm-up step 416 may take between about 5 and 30 minutes to reach $T_{air}$(min), depending on heating capacity of the system. It should be appreciated that the warm-up step 416 may include a hold time where the cooling compartment air temperature is held at the minimum temperature level $T_{air}(min)$ to allow further heat exchange between the air and the structure/moisture.

In an alternative embodiment, the air temperature of the cooling compartment 128 may be increased by simply running the fan 148 (and/or other fans) for an extended period of time. It can be appreciated, however, that by using the fan(s) to increase the air temperature rather than the coil assembly, significantly more time would be needed to raise the temperature. The air temperature of the cooling compartment 128 may instead be increased in any other suitable manner.

The warm-up step 416 is followed by a cool-down step 420 designed to evaporate moisture within the cooling compartment 128 and condense the evaporated moisture onto the coil assembly. During the cool-down step 420, the air temperature of the cooling compartment 128 is decreased to a maximum air temperature level or range ($T_{air}(max)$), as defined by predetermined parameters programmed into the control system 170, such as, for instance, −5° C. to +5° C. To decrease the air temperature in the cooling compartment 128, the control system 170 may operate the interior coil section 144 as an evaporator to circulate cool air in the cooling compartment 128. Refrigerant is fed into the interior coil section 144 to lower and hold the coil to a suitable temperature, such as between about −15° C. to −50° C., cooling the air near the interior coil section 144. The fan 148 is activated to circulate the cooled air throughout the cooling compartment 128.

During the cool-down step 420, the surfaces of the interior coil section 144 are significantly colder than the dew point of the circulating air. Accordingly, moisture from the air (which, as noted above, is essentially at saturated conditions after the cleaning cycle) begins to condense/freeze onto the surfaces of the interior coil section 144, drying the air. The cooler air, which is also now drier, continues to circulate over the structure and moisture in the cooling compartment 128. The temperature of the structure and the moisture in the cooling compartment 128, however, remains higher than the temperature of the circulating air. Accordingly, the vapour pressure at the surface of the moisture is higher than the vapour pressure of the circulated air. This difference in vapour pressure causes at least some of the moisture on the structure in the cooling compartment 128 to evaporate. The heat to evaporate the moisture is taken from the structure and the moisture (which was heated in the warm-up step 416), which will both gradually decrease in temperature.

As noted above, the surfaces of the interior coil section 144 are significantly colder than the dew point of the circulating air during the cool-down step 420. Accordingly, the evaporated moisture condenses/freezes onto the surfaces of the interior coil section 144, drying the air again. The condensed moisture (if not frozen) drips off the interior coil section 144 and exits the cooling compartment 128 through the drain 164.

The cool-down step 420 is operated for an amount of time (such as 5 to 30 minutes) until the temperature of the structure/moisture decreases below a threshold level ($T_{evap}$) at which significant evaporation of the moisture will decay. The cool-down step 420 ends when the temperature level $T_{air}(max)$ is reached or surpassed. In that regard, it should be noted that the cool-down step 420 may be extended in length (time) after $T_{air}(max)$ is achieved, and it may be followed by a defrost step 424, as later described.

At the termination of the cool-down step 420, if the moisture within the cooling compartment 128 has not substantially evaporated, condensed or frozen onto the coil section (and defrosted/thawed if required), and drained from the cooling compartment 128, the drying process (including the warm-up step 416, cool-down step 420, and a defrost step if required) is repeated until substantially all the moisture is removed from the structure in the cooling compartment 128.

It should be noted that the cool-down step 420 (and the overall drying process) would be substantially shorter if the air, structure, and moisture inside the cooling compartment 128 did not decrease in temperature during the cool-down step 420. In that regard, an additional heat source may be run simultaneously with the cooling coil to help minimize the decrease in temperature of the air, structure, and moisture inside the cooling compartment 128 during the cool-down step 420. However, it can be appreciated that the use of an additional heat source may not be realistic for practical reasons (space, cost, power requirements, etc.). Accordingly, the warm-up and cool-down steps 416 and 420 can instead be repeated as necessary to substantially dry the cooling compartment 128.

More specifically, after the cool-down step 420, if a significant amount of moisture remains within the cooling compartment 128, at least a portion of the drying process may be repeated until the moisture level is acceptable. The acceptable moisture level threshold within the cooling compartment 128 ($Moisture_{Max}$), and specifically, the moisture remaining on the structure within the cooling compartment 128 (i.e. the belt) and not including the moisture frozen on the interior coil section 144, can be defined by predetermined parameters programmed into the control system 170. The $Moisture_{Max}$ level can be, for instance, less than 5% moisture remaining.

A sensor(s) (not shown) may be used to detect the amount of moisture remaining on the structure within the cooling compartment 128, or the moisture level may instead be manually determined in a suitable manner. If a sensor(s) is used, it may be in communication with control system 170. In that regard, the sensor(s) may be activated to output one or more output signals that are received and processed by the control system 170. After processing the output signals from the sensor, the drying process may be re-started or terminated in response to one or more instructions sent from the control system 170.

If re-started, the freezer system 120 may be run through another cycle of the drying process, including at least a warm-up step 416 to load energy into the moisture and structure in the cooling compartment 128 followed by a cool-down step 420 to evaporate the moisture and condense the evaporated moisture onto the coil assembly. The warm-up step 416 and subsequent cool-down step 420 may be repeated as many times as necessary to substantially dry the cooling compartment 128.

Certain additional optional steps may be included in the first or subsequent cycles of the drying process. For instance, an optional defrost step 424 may be used to defrost the interior coil section 144 as necessary during any stage of the drying process. As discussed above, during the cool-down step 420, the surfaces of the interior coil section 144 are significantly colder than the dew point of the circulating air. Accordingly, moisture from the air condenses/freezes onto the surfaces of the interior coil section 144. If needed, an optional defrost step 424 may be used to melt some or all of the frozen moisture on the interior coil section 144 after the cool-down-step 420 or at another point during or after the drying process.

During the optional defrost step 424, hot gas is fed into the interior coil section 144 to thaw the frozen moisture, allowing it to drip off the coil section and out the drain 164. The fan 148 (and any other air circulation devices) will be turned off to speed up the defrosting processing by facilitating drip off and by avoiding drawing water droplets by the airstream back into the cooling compartment 128.

The optional defrost step 424 may be used during each drying process cycle (after the cool-down step 420 and before the warm-up step 416), at the end of the drying process (before the freezer system 120 is brought back into operation), or when needed (as determined manually or by sensors in communication with the control system 170).

When the drying process has terminated, an optional finishing cool-down step may be used to bring the temperature of the cooling compartment 128 back down toward operating temperature. The optional finishing cool-down step may be substantially identical to the cool-down step 420 described above in that the interior coil section 144 is operated as an evaporator to move cooled air into the cooling compartment 128. The air temperature of the cooling compartment 128 is decreased to a maximum air temperature level or range ($T_{operation}$(Max)), as defined by predetermined parameters programmed into the control system 170, such as, for instance, −5° C. to +5° C.

It can be appreciated that if the optional defrost step 424 is skipped at the end of the drying process, the optional cool-down step may be unnecessary. By skipping the defrost step 424, the interior coil section 144 may have some remaining frozen moisture accumulation. However, the belt and drive system in the freezer will be properly dried and the freezer system 120 can be brought back into production quicker. The drying process steps may be chosen depending on the specific situation and the system used.

EXPERIMENT

A series of tests were performed to determine the difference between a prior art drying method and the enhanced drying process as described and shown herein. Prior to this comparison test, an evaluation test was run to evaluate the automatic controls of the refrigeration valves and the freezer function.

The drying method comparison tests were performed on a GC40-10-19-A NN CCR spiral freezer, installed at JBT FoodTechCentre in Helsingborg, Sweden. The spiral freezer included a Frigoscandia LVS refrigeration unit, as substantially described above with respect to FIG. 4.

The method to measure and quantify the "dryness" within the cooling compartment, or rather, how much water remained on the belt, was done by letting a defined length of the belt pass over two dishcloths, and thereafter measuring the water content of the dishcloths. More specifically, the belt water content was quantified by weighing the wet but well squeezed cloths before and after a 5 m sweep. The 50 m long mesh belt was divided into ten equivalent 5 m long sections to gather ten data points.

The specific steps of the enhanced drying process used for the test were as follows:
1. Perform a belt wash (i.e., a cleaning cycle).
2. Warm-up step started (i.e., the freezer compartment and belt stack is heated up with hot gas and fans.
3. Belt blower (fans) on.
4. Warm-up stopped, fans stop, valve pressure is reduced (equalizes).
5. Cool-down step started (fans, liquid refrigerant fed to coil, and suction valve on/open).
6. Stop cool-down step when air temperature achieved (~0° C.).
7. Defrost coil with hot gas.
8. Repeat steps 1-7 until belt is dry.

Figure 6:
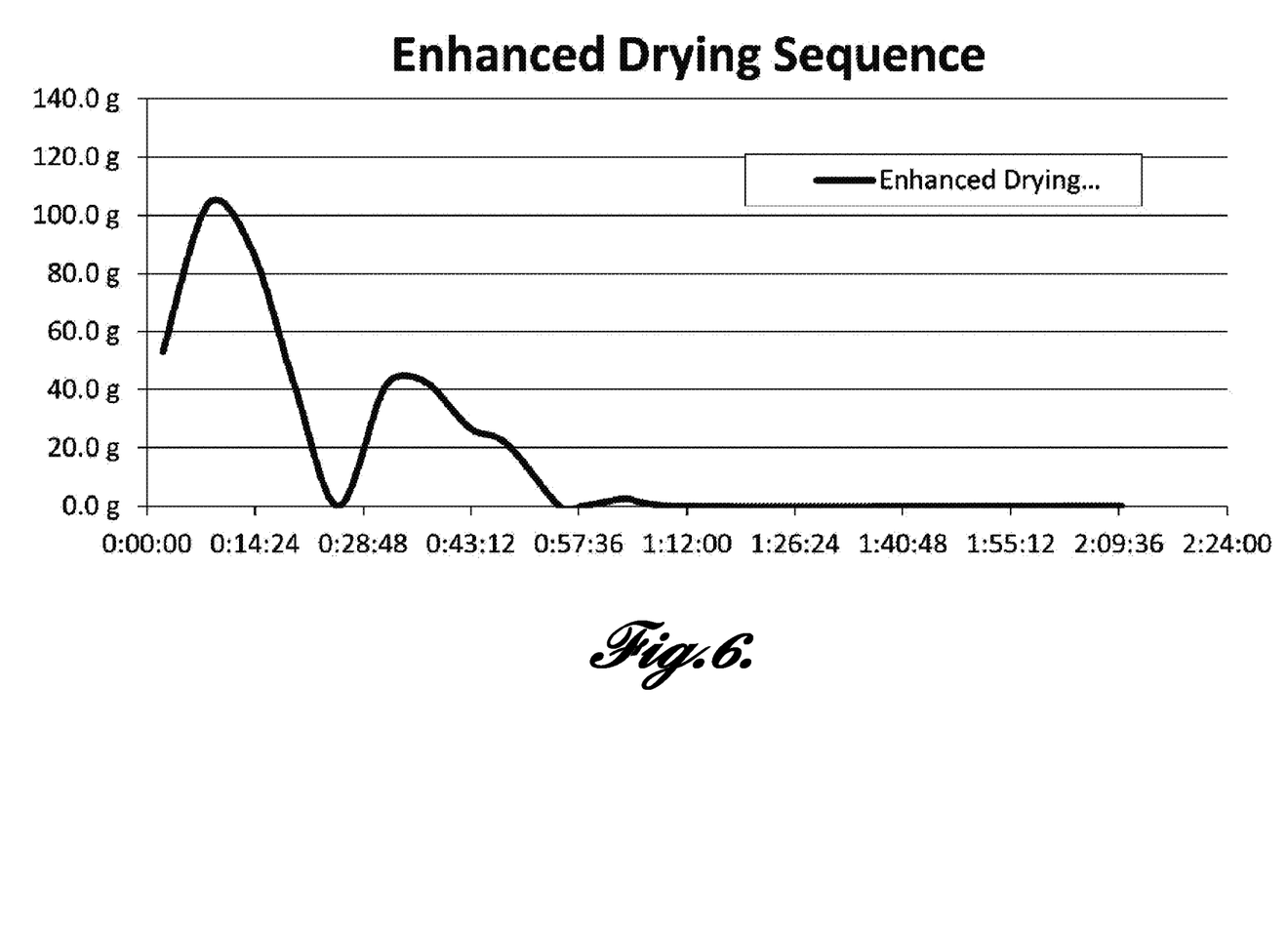
FIG. 6 is a graph depicting the measured reduction of moisture within a cooling compartment over time using a method formed in accordance with the present disclosure.

The enhanced drying process was completed in less than one hour and the freezer was chilled after completion. The measurements taken during the test are tabulated in the chart shown in FIG. 6, where the water content of the belt is shown as a factor of time. The water content of the belt started at around 105 g water. It should be noted that at data point #2 (time=28:48), the belt was cooled down and the water actually froze on the mesh, thereby causing a 0 g water measurement.

Figure 7:
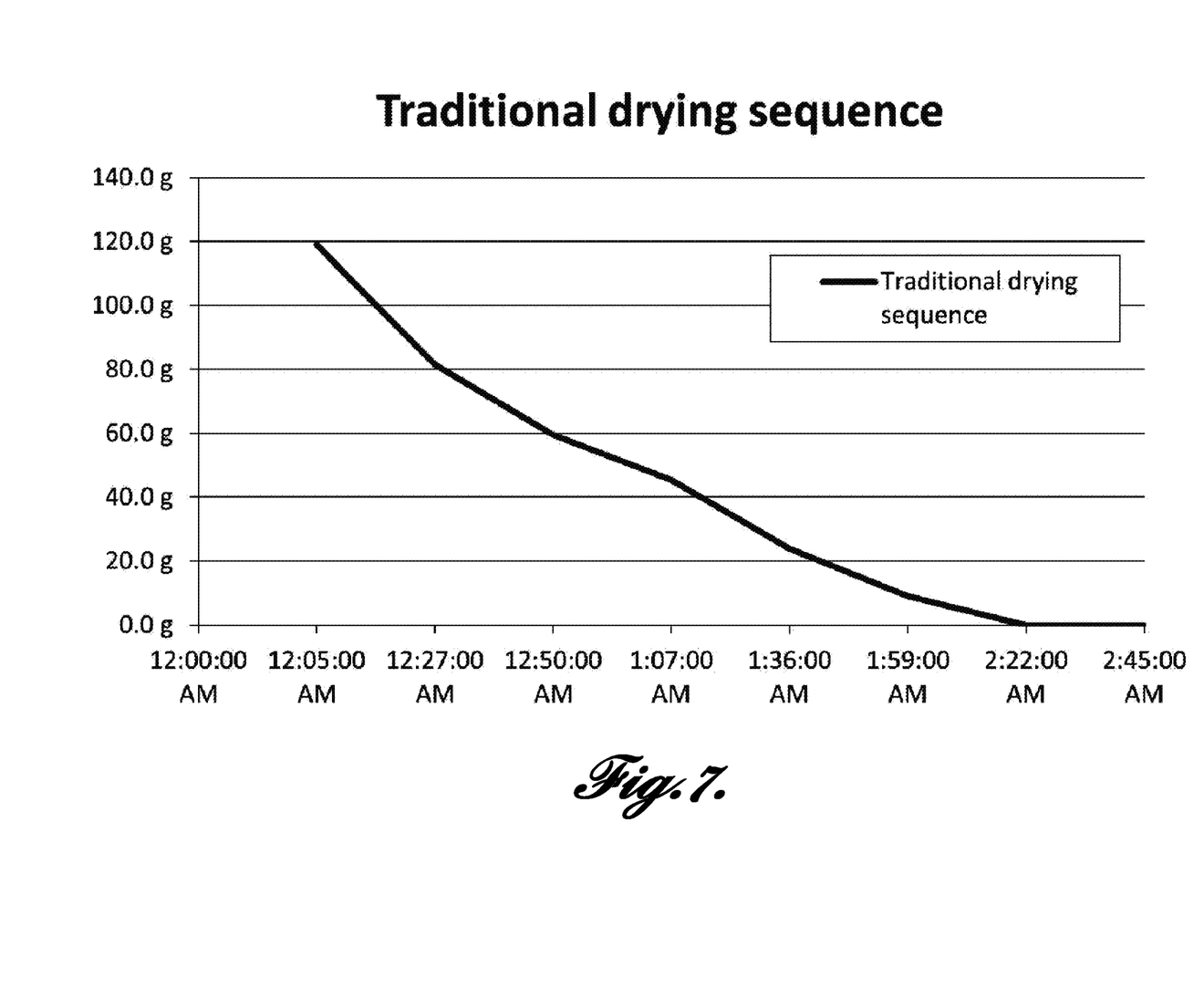
FIG. 7 is a graph depicting the measured reduction of moisture within a cooling compartment over time using a prior art method.

The specific steps of the traditional drying process used for the test included performing a belt wash (i.e., a cleaning cycle), and thereafter running the freezer fans and the belt blower until the belt was dry. The measurements taken during the test are tabulated in the chart shown in FIG. 7, where the water content of the belt is shown as a factor of time. The water content of the belt started at around 120 g water. The drying process took about 2 hours and 20 minutes to achieve a dry belt. At the termination of the traditional drying process, the freezer temperature was about 42° C.

Apart from significantly speeding up the belt drying time with the use of the enhanced drying process (compared to the traditional drying process), additional benefits observed include lower power consumption during the drying process, less (or almost no) humid load on the production area climate control system, avoidance of high drying temperatures inside the spiral freezer (leading to less wear and tear on the drive system and less oil consumption), and leaving the freezer in chilled conditions for a quicker start up time and even less power consumption.

While illustrative embodiments have been illustrated and described, it will be appreciated that various changes can be made therein without departing from the spirit and scope of the invention.

The invention claimed is:

1. A method of reducing moisture content of a cooling compartment comprising a conveyor system configured to transport products during cooling of the same in the cooling compartment, the method comprising:
    after a period of operation of the cooling compartment which has resulted in wet surfaces inside the cooling compartment, increasing an air temperature of the cooling compartment to a minimum temperature level needed to load energy into the air, moisture, and structure within the cooling compartment;
    after reaching the minimum air temperature level, decreasing the air temperature of the cooling compartment to a maximum temperature level needed to condense evaporated moisture to produce cooler drier air, and evaporate at least some moisture from the wet surfaces into the cooler drier air within the cooling compartment; and
    draining condensed moisture that lowers the moisture content of the cooling compartment.

2. The method of claim 1, wherein the cooling compartment is a freezer compartment.

3. The method of claim 1, further comprising operating a coil assembly to decrease or increase the temperature of the cooling compartment.

4. The method of claim 3, further comprising operating the coil assembly as a condenser to increase the air temperature of the cooling compartment.

5. The method of claim 3, further comprising operating the coil assembly as a condenser to increase the air temperature of the cooling compartment and operating the coil assembly as an evaporator to decrease the air temperature of the cooling compartment.

6. The method of claim 5, further comprising switching the coil assembly between a condenser and an evaporator by operating a valve assembly.

7. The method of claim 5, further comprising activating an operating system to switch the coil assembly between a condenser and an evaporator.

8. The method of claim 3, wherein the coil assembly is a freezer coil.

9. The method of claim 1, further comprising operating the coil assembly as an evaporator to condense evaporated moisture onto the coil assembly.

10. The method of claim 1, further comprising operating the coil assembly as an evaporator to freeze evaporated moisture onto the coil assembly.

11. The method of claim 10, further comprising heating the coil assembly to melt at least some of the frozen evaporated moisture on the coil assembly.

12. The method of claim 1, further comprising operating a coil assembly as an evaporator to decrease the air temperature of the cooling compartment and condense moisture onto the coil assembly.

13. The method of claim 12, further comprising heating the coil assembly to melt at least some of the frozen evaporated moisture on the coil assembly.

14. The method of claim 1, further comprising repeating at least the steps of increasing the air temperature of the cooling compartment, decreasing the air temperature of the cooling compartment, and then draining condensed moisture until the cooling compartment is substantially dry.

15. The method of claim 1, further comprising decreasing the air temperature of the cooling compartment to a maximum temperature level before increasing the air temperature of the cooling compartment to a minimum temperature level.

16. The method of claim 15, further comprising repeating at least the steps of increasing the air temperature of the cooling compartment, decreasing the air temperature of the cooling compartment, and then draining condensed moisture until the cooling compartment is substantially dry.

17. The method of claim 16, further comprising decreasing the air temperature of the cooling compartment to a maximum operating temperature level after draining the condensed moisture.

18. The method of claim 1, further comprising decreasing the air temperature of the cooling compartment to a maximum operating temperature level after draining the condensed moisture.

19. A system for reducing moisture content of a cooling compartment comprising a conveyor system configured to transport products during cooling of the same in the cooling compartment, the moisture reduction system comprising:
   a coil assembly configured to increase an air temperature of the cooling compartment to a minimum temperature level needed to load energy into the air, moisture, and structure within the cooling compartment and decrease the air temperature of the cooling compartment to a maximum temperature level needed to condense evaporated moisture to produce cooler drier air, and evaporate at least some moisture into the cooler drier air within the cooling compartment; and
   a drain for draining condensed moisture, and
   a control system configured to increase the air temperature of the cooling compartment to the minimum temperature level followed by decreasing the air temperature of the cooling compartment to the maximum temperature level.

* * * * *